United States Patent [19]

Harris

[11] 4,296,055

[45] Oct. 20, 1981

[54] METHOD OF INJECTION MOLDING THERMOPLASTIC RESINOUS PRODUCTS SUBSTANTIALLY FREE FROM SINK MARKS, SWIRLS AND RELATED BLEMISHES

[75] Inventor: Wilford D. Harris, Midland, Mich.

[73] Assignee: The Dow Chemical Company, Midland, Mich.

[21] Appl. No.: 10,188

[22] Filed: Feb. 7, 1979

Related U.S. Application Data

[63] Continuation of Ser. No. 839,055, Oct. 3, 1977, abandoned, which is a continuation of Ser. No. 679,638, Apr. 22, 1976, abandoned.

[51] Int. Cl.$^3$ .............................................. B29D 27/00
[52] U.S. Cl. ..................................... 264/45.5; 264/53; 264/54; 264/328.16; 264/328.17; 264/DIG. 5; 264/DIG. 83

[58] Field of Search ....... 264/45.5, DIG. 83, DIG. 5, 264/53, 54, 328.16, 328.17

[56] References Cited

U.S. PATENT DOCUMENTS

| | | | |
|---|---|---|---|
| 3,200,176 | 8/1965 | Baxter ........................ | 264/DIG. 83 |
| 3,268,635 | 8/1966 | Kraus et al. ................ | 264/DIG. 83 |
| 3,399,098 | 8/1968 | Omoto et al. ................ | 264/DIG. 5 |
| 3,960,996 | 6/1976 | Balevski et al. ............. | 264/45.5 X |

*Primary Examiner*—Philip Anderson
*Attorney, Agent, or Firm*—R. B. Ingraham

[57] ABSTRACT

Injection moldings have excellent surface gloss and freedom from sink marks are obtained using a pressurized mold and molding composition containing a volatile fluid foaming agent, a thermally decomposable foaming agent and a finely divided nucleating agent.

5 Claims, No Drawings

METHOD OF INJECTION MOLDING THERMOPLASTIC RESINOUS PRODUCTS SUBSTANTIALLY FREE FROM SINK MARKS, SWIRLS AND RELATED BLEMISHES

CROSS-REFERENCE TO RELATED APPLICATION

This is a continuation of application Ser. No. 839,055, filed Oct. 3, 1977 which is a continuation of application Ser. No. 679,638 filed Apr. 22, 1976 and both now abandoned.

In the injection molding of thermoplastics, a wide variety of shaped articles may be obtained. Generally such injection moldings fall into two broad categories: functional moldings and functional and decorative moldings. Satisfactory injection molded parts are readily achieved where the part is of a functional nature and surface gloss and sink marks are of no importance, however, when one wishes to prepare articles from an injection molding process wherein high surface gloss and freedom from sink marks is required, rather severe limitations are encountered. In general, it is usually necessary to maintain the thickness of the part or portions of the part at a more or less constant thicknes. Reinforcing ribs generally can be no more than 0.8 times the thickness of the wall, otherwise sink marks will usually appear. One method of avoiding unsightly sink marks is to use a two-step injection molding procedure often referred to as sandwich molding wherein a first or skin material is discharged into the mold partially filling it and then a foamable thermoplastic composition is injected into the mold through the same sprue to effectively inflate the skin material and fill the mold. Another process simultaneously injects skin material and foamable core material into the mold to result in a skinned or composite article. It is known that the incorporation of small amounts of blowing agent in a resinous composition used in injection molding tends to reduce sink marks; however, the inclusion of a blowing agent in a plastic injection molding composition usually gives rise to surface irregularities which in most cases are undesirable and frequently referred to as swirls. Usually such defects have an appearance which somewhat resembles wood grain. Injection molding of thermoplastics containing blowing agents is discussed in: Plastverarbeiter 4, 208–12 (1964) and Plastverarbeiter 12, 705–11 (1964), *Injection Molding of Thermo plastics which Contain Blowing Agent* by W. Nickolaus and J. Breitenbach.

It would be desirable if there were available an improved method for the injection molding of thermoplastic synthetic resinous compositions to provide articles of widely varying thickness having highly desirable surface characteristics.

It would also be desirable if there were available an improved molding process for the injection molding of synthetic resinous compositions which would provide articles which faithfully reproduce the surface of the mold and avoid sink marks.

These benefits and other advantages in accordance with the present invention are achieved in a method for the injection molding of synthetic resinous thermoplastic injection moldable compositions, the method comprising providing a heat-plastified synthetic resinous composition injecting the heat-plastified composition into a mold cavity, the mold cavity having walls below the thermoplastic temperature of the composition, cooling the composition within the mold configuration until it is at least self-supporting and removing the compositions from the mold, the improvement which comprises incorporating within the composition and in intimate admixture therewith a volatile fluid foaming agent, a particulate thermally decomposable blowing agent, a finely divided nucleating or cell inducing agent and injecting the composition into the cavity under conditions which prevent foaming of the composition until the cavity is filled with the resinous composition.

The present invention can be practiced using any injection moldable thermoplastic synthetic resinous composition. Such compositions include: polystyrene, polyvinyl chloride, polyvinyl acetate, polymethyl methacrylate, polyethylene, polypropylene; polyamides such as: nylon 6, nylon 66, and the like, but not limited to these materials.

The method of the invention can be practiced using any injection molding equipment which has been modified to maintain a gas pressure within the mold cavity during the injection cycle. Such a modification is readily accomplished by providing a gas passage communicating with the mold cavity and applying a gas pressure thereto to prevent foaming of the composition as it enters the mold. Generally, such pressures are from about 60 to 500 pounds per square inch gauge. In most instances, air is satisfactory as mold pressurizing gas. In some cases where the gas is not readily displaced from the mold on injection of the foaming composition, it is desirable to employ nitrogen or other inert gas for pressurizing the mold. In the event that gas economy is desired, the mold can be modified by milling a recess about a portion of the cavity in one of the mating surfaces of a two-part mold and an O-ring placed within the recess to provide an effective gas seal. In the event that such an approach is employed, provision must be made for venting the mold gas through the gas filling port such as with a pressure relief valve in the gas filling line or by adjusting the clamping pressure to permit escape of the gas across the O-ring during the filling cycle. Particular blowing agents useful in the practice of the present invention are well-known in the art for the preparation of plastic foams and include:

The particulate thermally decomposable blowing agent generally should be capable of passing through a number 140 U.S. Sieve size screen (openings 105 microns) or to be dispersed into equivalent sized particles when blended with the thermoplastic synthetic resin, that is, in a readily dispersible form.

Generally the volatile fluid foaming agent can be incorporated into the thermoplastic composition at any time, for example, it may be incorporated into the polymer during the polymerization. It may be impregnated into the polymer particles after polymerization by pressurizing the particles in an atmosphere of the volatile fluid foaming agent. It may be incorporated into a heat-plastifying melt of the composition and subsequently mixed therewith and cooled below the foaming temperature and extruded without foaming.

Talc employed in the present invention is preferably in a finely-divided form and advantageously has a particle size of 2 microns or less as determined by examination in a light microscope. The amount of talc present in the mixture should be not less than 0.2 parts by weight per 100 parts by weight of the synthetic resin employed. Sufficient blowing agents, both the solid and the fluid foaming agents, must be present in a quantity sufficient to provide cell formation in the molded part sufficient to compensate for shrinkage during cooling. If excessive blowing agent is used, excellent parts may be obtained provided the part is maintained for a period sufficiently long that at least the surface regions of the molded part can no longer be deformed by the pressure of the blowing agent within the molded part. The precise quantity of blowing agent which is optimum will vary with the part to be molded, chosen operating conditions including temperature, feed rate, injection rate, mold temperature and the like; many variables encountered in the injection molding of plastics. Batch-to-batch variation in the resin can oftentimes require a change in the blowing agent level. The precise quantity of blowing agents employed is readily determined by trial and error by anyone skilled in the injection molding art. Because of the many variables in injection molding, it is frequently desirable to employ a blowing agent concentrate which conveniently may have the volatile fluid foaming agent in a synthetic resinous thermoplastic injection mold carrier which can be an identical resin to the resin being molded or a resin compatible therewith. Advantageously, resinous particles containing volatile fluid foaming agent are admixed with a small quantity of a plasticizing type wetting agent for the carrier resin, for example, mineral oil, dioctyl phthalate, liquid polyalkylene glycols, and the like. The resin particles are admixed with the mineral oil to lightly coat the particles. The particulate decomposable blowing agent and talc are then added with agents to the wetting agent coated granules; the mixture tumbled until the talc and blowing agent are generally uniformly distributed on the surface of the particles. Such a concentrate is particularly desirable in determining molding conditions for any particular article, in that the ratio of blowing agent and total synthetic resin may be conveniently varied as one determines optimum molding conditions.

In the following examples, all parts are parts per 100 parts of resin unless otherwise designated.

EXAMPLE 1

A mixture is prepared of 100 parts by weight of polystyrene injection molding granules, 10 parts by weight of polystyrene molding grade particles containing 7 percent by weight of a mixture of 80 percent by weight trichloromonofluoro methane and 20 percent normal pentane, 0.25 parts by weight of talc having a particle size of less than 2 microns, 0.13 parts mineral oil and 0.25 parts of azodicarbonamide. The latter four components are dry-blended together and then dry-blended with the polystyrene. The resultant mixture was fed to an injection molding machine with a gas-pressurized mold. The temperatures of the injection molding process were: Barrel Set Temperature 260° F., Middle Section 300° F., Front Section 360° F., Nozzle 370° F., Melt Temperature 370° F., and Mold Temperature 110° F. The mold had a rectangular base plate cavity 0.125 inch thick with a short cylinder above the base plate having a diameter of about 0.7 inch and a raised height of about 0.750 inch. The mold was pressurized with air to a pressure of about 100 pounds per square inch. An O-ring was disposed in the face of one of the mold halves and surrounded the cavity to prevent gas leakage. Highly desirable molded parts were obtained having surfaces substantially free from sink marks, swirls and related blemishes. By way of comparison, when molding grade polystyrene alone was employed severe sink marks were evident. When the foregoing mixture was molded without pressurizing the mold, sink marks were absent but surface blemishes such as major swirl marks were evident.

EXAMPLE 2

The procedure of Example 1 was followed employing like proportions wherein the molding polymer was a copolymer of about 75 parts styrene and 25 parts arcylonitrile. The volatile blowing agent concentrate was of a like polymer which contained 13 percent by weight of a mixture of 80 percent trichlorofluoromethane and 20 percent pentane. Talc, mineral oil and azodicarbonamide were used at the same concentrations. The temperatures of the injection molding process were: Barrel Set Temperature 300° F., Middle Section 350° F., Front Section 420° F., Nozzle 400° F., Melt Temperature 410° F., Mold Temperature 145° F., and Air Pressure in Mold 120 pounds per square inch gauge. Similar results were obtained. Molding conditions were adjusted to compensate for the difference in melt viscosity of the polymer.

EXAMPLE 3

The procedure of Example 2 was repeated with the exception that the molding grade resin employed was an ABS plastic commercially available under the Trade Designation ABS 500. The temperatures of the injection molding process were: Barrel Set Temperature 300° F., Middle Section 350° F., Front Section 420° F., Nozzle 400° F., Melt Temperature 410° F., Mold Temperature 145° F., and Air Pressure in Mold 120 pounds per square inch gauge. Similar results were obtained. Molding conditions were adjusted to compensate for the difference in melt viscosity of the polymer.

EXAMPLE 4

The procedure of Example 2 was repeated with the exception that the molding grade resin was a mixture of a polyphenylene oxide and an impact polystyrene commercially available under the Trade Designation Noryl FN-212. The temperatures of the injection molding process were: Barrel Set Temperature 300° F., Middle Section 350° F., Front Section 420° F., Nozzle 400° F., Melt Temperature 410° F., Mold Temperature 145° F., and Air Pressure in Mold 120 pounds per square inch gauge. Similar results were obtained. Molding conditions were adjusted to compensate for the difference in melt viscosity of the polymer.

EXAMPLE 5

The procedure of Example 2 was repeated with the exception that the molding grade resin was a polycarbonate commercially available under the Trade Designation Lexan 141-122. The temperatures of the injection molding process were: Barrel Set Temperature 325° F., Middle Section 375° F., Front Section 540° F., Melt Temperature 520° F., Mold Temperature 160° F., and Air Pressure in Mold 120 pounds per square inch gauge. Similar results were obtained. Molding conditions were adjusted to compensate for the difference in melt viscosity of the polymer.

EXAMPLE 6

The procedure of Example 2 was repeated with the exception that the molding grade polymer was a styrene-acrylonitrile resin and chlorinated polyethylene. The temperatures of the injection molding process were: Barrel Set Temperature 300° F., Middle Section 350° F., Front Section 390° F., Nozzle 380° F., Melt Temperature 390° F., Mold Temperature 110° F., and Air Pressure in Mold 120 pounds per square inch gauge. Similar results were obtained. Molding conditions were adjusted to compensate for the difference in melt viscosity of the polymer.

Employing the procedures as generally set forth in the foregoing examples and specification, other injection moldable thermoplastic resinous compositions are readily molded to provide articles having surfaces substantially free from sink marks, swirls, and related blemishes.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the injection molding of synthetic resinous thermoplastic injection moldable compositions, the method comprising providing a heat-plastified synthetic resinous composition, injecting the heat-plastified composition into a mold cavity to fill the cavity, the mold cavity having walls below the thermoplastic temperature of the composition, cooling the composition within the mold configuration until it is at least self-supporting and removing the compositions from the mold, the improvement which comprises modifying said heat-plastified resinous composition by incorporating within the composition and in intimate admixture therewith a volatile fluid foaming agent, a particulate thermally decomposable blowing agent, the foaming agent being present in quantity sufficient to provide cell formation in the molded part and sufficient to compensate for shrinkage during cooling, a finely divided nucleating or cell inducing agent and providing a gas under pressure within the mold cavity sufficient to prevent foaming of the composition until the cavity is filled with the resinous composition, injecting said modified heat-plastified composition into said cavity, under said gas pressurized conditions which prevent foaming of the composition until the cavity is filled with the resinous composition whereby a molding substantially free from sink marks, swirls and related blemishes is obtained.

2. The method of claim 1 wherein the gas is air.

3. The method of claim 1 wherein the air within the mold cavity is under a pressure from within 60 to 500 pounds per square inch guage.

4. The method of claim 1 wherein the particulate thermally decomposable blowing agent is of such a size that it passes through a sieve having openings of 105 microns.

5. In a method for the injection molding of synthetic resinous thermoplastic injection molding compositions, the method comprising providing a heat-plastified synthetic resinous compositions, injecting the heat-plastified composition into a mold cavity to fill the cavity, the mold cavity having walls below the thermoplastic temperature of the composition, cooling the composition within the mold configuration until it is at least self-supporting and removing the composition from the mold, the improvement which comprises incorporating within the composition and in intimate admixture therewith a volatile fluid foaming agent, a particulate thermally decomposable blowing agent, the foaming agent being present in quantity sufficient to provide cell formation in the molded part and sufficient to compensate for shrinkage during cooling, a finely divided nucleating or cell inducing agent and injecting the composition into the cavity having a gas pressure of from 60 to 500 pounds per square inch gauge within the cavity to thereby prevent foaming of the composition until the cavity is filled with the resinous composition whereby a molding substantially free from sink marks, swirls and related blemishes is obtained.

* * * * *